(12) United States Patent
Gavigan

(10) Patent No.: US 10,029,134 B2
(45) Date of Patent: Jul. 24, 2018

(54) MOST FIT EXERCISE SLEDGE HAMMER WITH HEAD MOLDED TO AND THROUGH HANDLE

(71) Applicant: Andrew Gavigan, West Hills, CA (US)

(72) Inventor: Andrew Gavigan, West Hills, CA (US)

(*) Notice: Subject to any disclaimer, the term of this patent is extended or adjusted under 35 U.S.C. 154(b) by 225 days.

(21) Appl. No.: 14/877,490

(22) Filed: Oct. 7, 2015

(65) Prior Publication Data
US 2016/0096057 A1    Apr. 7, 2016

Related U.S. Application Data

(63) Continuation-in-part of application No. 13/860,256, filed on Apr. 10, 2013, now abandoned.

(51) Int. Cl.
| | | |
|---|---|---|
| *A63B 15/00* | (2006.01) | |
| *A63B 65/04* | (2006.01) | |
| *A63B 15/02* | (2006.01) | |
| *A63B 21/06* | (2006.01) | |
| *A63B 43/02* | (2006.01) | |
| *A63B 43/06* | (2006.01) | |
| *A63B 21/00* | (2006.01) | |
| *A63B 71/06* | (2006.01) | |
| *A63F 13/245* | (2014.01) | |
| *A63B 60/54* | (2015.01) | |

(52) U.S. Cl.
CPC .............. *A63B 15/00* (2013.01); *A63B 15/02* (2013.01); *A63B 21/0608* (2013.01); *A63B 43/02* (2013.01); *A63B 43/06* (2013.01); *A63B 65/04* (2013.01); *A63B 21/4035* (2015.10); *A63B 60/54* (2015.10); *A63B 71/0622* (2013.01); *A63B 2071/0666* (2013.01); *A63B 2071/0694* (2013.01); *A63B 2207/02* (2013.01); *A63B 2209/10* (2013.01); *A63B 2210/50* (2013.01); *A63B 2220/13* (2013.01); *A63B 2220/17* (2013.01); *A63B 2220/53* (2013.01); *A63B 2220/806* (2013.01); *A63B 2225/54* (2013.01); *A63F 13/245* (2014.09)

(58) Field of Classification Search
CPC ......... A63B 65/04; A63B 15/00; A63B 43/02; A63B 43/06; A63B 49/08; A63B 60/06; A63B 4/02; Y10T 403/475
USPC ...................... 264/241, 259, 271.1
See application file for complete search history.

(56) References Cited

U.S. PATENT DOCUMENTS

| | | | | |
|---|---|---|---|---|
| 1,532,135 A | * | 4/1925 | Gibbs ................... | B25D 1/02 81/19 |
| 2,225,151 A | | 12/1940 | Borba | |

(Continued)

OTHER PUBLICATIONS

U.S. Appl. No. 13/860,256, filed Apr. 10, 2013, A. Gavigan.

*Primary Examiner* — Nyca T Nguyen
(74) *Attorney, Agent, or Firm* — William J. Benman; Benman, Brown & Williams

(57) ABSTRACT

A hammer with an elongate handle having a longitudinal axis, a proximal end and a distal end; a protrusion mounted at the distal end of the handle having a pin and a notch therethrough oriented along a transverse axis relative to the longitudinal axis and a flexible generally geometrically uniform mass affixed to the handle at the distal end thereof. The mass is molded onto the distal end of the handle whereby at least part of the mass extends through and fully occupies a channel in the handle and cooperates with the pin to secure the mass to the handle.

6 Claims, 2 Drawing Sheets

(56) References Cited

U.S. PATENT DOCUMENTS

| | | | | |
|---|---|---|---|---|
| 2,388,463 | A * | 11/1945 | Benecke | A63B 15/00 434/252 |
| 2,388,879 | A * | 11/1945 | Stanley | B64C 27/023 244/123.9 |
| 2,396,408 | A * | 3/1946 | Benecke | A63B 69/3635 473/234 |
| 2,935,321 | A * | 5/1960 | Lhotka | A63B 15/00 273/317 |
| 3,042,092 | A * | 7/1962 | Ekstrom | B25G 3/26 164/385 |
| 3,543,715 | A * | 12/1970 | Hill | B60C 23/00 116/34 A |
| 3,759,527 | A * | 9/1973 | Witherspoon | A63B 53/02 473/306 |
| 4,139,930 | A * | 2/1979 | Cox | B25D 1/00 30/308.1 |
| 5,138,535 | A | 8/1992 | Aragon, Jr. | |
| 5,259,274 | A * | 11/1993 | Hreha | B25G 3/34 81/20 |
| 5,588,343 | A * | 12/1996 | Rust | B25G 1/102 81/20 |
| 5,807,183 | A * | 9/1998 | Benson | A63B 15/005 473/206 |
| 5,839,847 | A * | 11/1998 | Patel | B29C 37/0082 403/265 |
| 5,996,442 | A * | 12/1999 | Carmien | B25D 1/02 294/53.5 |
| 6,106,482 | A * | 8/2000 | Cook | A61B 5/6896 600/553 |
| 6,132,345 | A | 10/2000 | Beierschmitt et al. | |
| 7,215,082 | B2 | 5/2007 | Arakawa et al. | |
| 7,785,211 | B2 * | 8/2010 | Hackenberg | A63B 53/14 473/224 |
| 7,959,528 | B1 | 6/2011 | Wilkes | |
| 2005/0261075 | A1 * | 11/2005 | Pullaro | A63B 15/00 473/256 |
| 2007/0268684 | A1 | 11/2007 | Chang | |
| 2009/0221388 | A1 | 9/2009 | Gannetti et al. | |
| 2010/0204020 | A1 | 8/2010 | Thomas et al. | |
| 2010/0302142 | A1 | 12/2010 | French et al. | |
| 2010/0304877 | A1 * | 12/2010 | Iwahashi | A63B 69/3632 473/223 |
| 2012/0149539 | A1 * | 6/2012 | Quader | A63B 21/08 482/109 |
| 2012/0266726 | A1 * | 10/2012 | Onello | B25D 1/14 81/20 |
| 2013/0040767 | A1 | 2/2013 | Gill | |
| 2014/0051554 | A1 * | 2/2014 | Walker | A63B 15/00 482/109 |
| 2014/0057763 | A1 * | 2/2014 | Fritsch | A63B 21/06 482/109 |
| 2014/0213422 | A1 | 7/2014 | Marcus | |

* cited by examiner

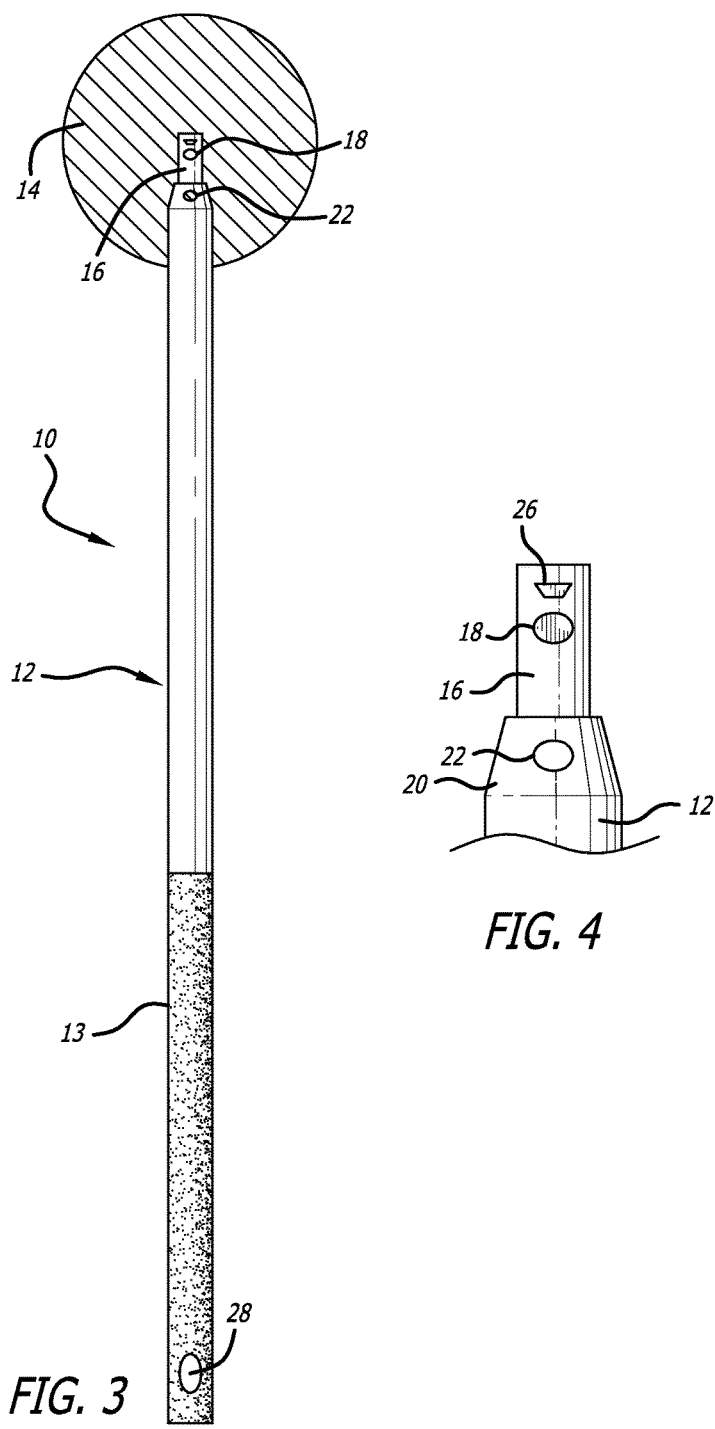

MOST FIT EXERCISE SLEDGE HAMMER WITH HEAD MOLDED TO AND THROUGH HANDLE

CROSS-REFERENCE TO RELATED APPLICATION

This is a Continuation-in-Part of copending U.S. patent application Ser. No. 13/860,256 filed Apr. 10, 2013, by A. Gavigan and entitled MOST FIT EXERCISE SLEDGE HAMMER the teachings of which are incorporated herein by reference.

BACKGROUND OF THE INVENTION

Field of the Invention:

The present invention relates to exercise apparatus. More specifically, the present invention relates to systems and techniques for exercising using sledge hammers, medicine balls and other similar apparatus.

Description of the Related Art:

In the fitness industry, a plethora of machines and devices have been used to facilitate muscular development, body health and overall fitness. One such device is a sledge hammer. As is well-known by many with experience in the use of sledge hammers for construction, exercise and other purposes, the repetitive motion of lifting a sledge hammer works a number of muscle groups including triceps, latissimus dorsi, rectus abdominus, transverse abdominus, internal and external obliques, lateral deltoids, rear deltoids, anterior deltoids, glutes, quadriceps, and hamstrings. Supplemental benefits of using the sledge hammer include aerobic conditioning, neuromuscular facilitation, coordination and increased excess post-exercise oxygen consumption (EPOC).

Typically, a conventional sledge hammer has a wooden handle and a metallic head. The handle can range from 0.5 meters (1 ft 8 in) to a full 1 meter (3 ft 3 in) in length, depending on the mass of the head. The head mass is usually 1 to 3 kilograms (2.2 to 6.6 lb). Modern heavy duty sledgehammers come with 10 to 20 pounds (4.5 to 9.1 kg) heads.

Sledgehammers usually require two hands and a swinging motion involving the entire torso, in contrast to smaller hammers used for driving in nails. The combination of a long swinging range, and heavy head, increase the force of the resulting impact.

Sledgehammers are increasingly being used as inexpensive exercise equipment; since all major upper body muscle groups need to put forth a significant amount of force when swinging a sledgehammer, it can easily be used to work muscles to failure as in resistance training.

When used for exercise, the hammer is struck against a flexible surface that safely dampens the momentum of the head. A rubber tire is often used as the hammer's target as its elasticity reduces the shock to the user's joints when used for this purpose.

Conventional sledge hammers used for exercise typically require two components, a hammer and a target surface for safely receiving the impact of the hammer. This adds to the cost and limits the options of a conventional sledge hammer as an exercise solution.

In addition, most sledge hammers do not allow for the weight of the head to be changed or adjusted. Accordingly, a hammer may be too light for some users and too heavy for others.

Hence, a need existed in the art for a simple all in one low cost sledge hammer implementation for exercise purposes that enables hammer heads of different weights and sizes to be used as an all-in-one solution without the need for supplemental equipment. This need was addressed by U.S. patent application Ser. No. 13/860,256 filed Apr. 10, 2013, by A. Gavigan entitled MOST FIT EXERCISE SLEDGE HAMMER the teachings of which have been incorporated herein by reference herein. This application disclosed and claimed a hammer with an elongate handle having a longitudinal axis and a flexible generally geometrically uniform mass affixed to the handle at a distal end thereof. In the illustrative embodiment, the mass is secured to the handle with a bolt adapted to extend through the mass and into the distal end of the handle. The bolt is threaded and engages mating threads in the handle. Preferably, a cone is disposed on the distal end of the handle between the handle and the mass to secure the mass to the handle.

However, a need remains in the art for an improvement in this design to further secure the hammer head to the handle.

SUMMARY OF THE INVENTION

The need in the art is addressed by the sledge hammer of the present invention. The inventive hammer includes an elongate handle having a longitudinal axis, a proximal end and a distal end; a protrusion mounted at the distal end of the handle having a pin and a notch therethrough oriented along a transverse axis relative to the longitudinal axis and a flexible generally geometrically uniform mass affixed to the handle at the distal end thereof. The mass is molded onto the distal end of the handle whereby at least part of the mass extends through and fully occupies a channel in the notch and cooperates with the pin to secure the mass to the handle.

BRIEF DESCRIPTION OF THE DRAWINGS

FIG. 3 is a sectional front view of the hammer depicted in FIG. 1.

FIG. 4 is a magnified view of the distal end of the handle of the hammer depicted in FIG. 3.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
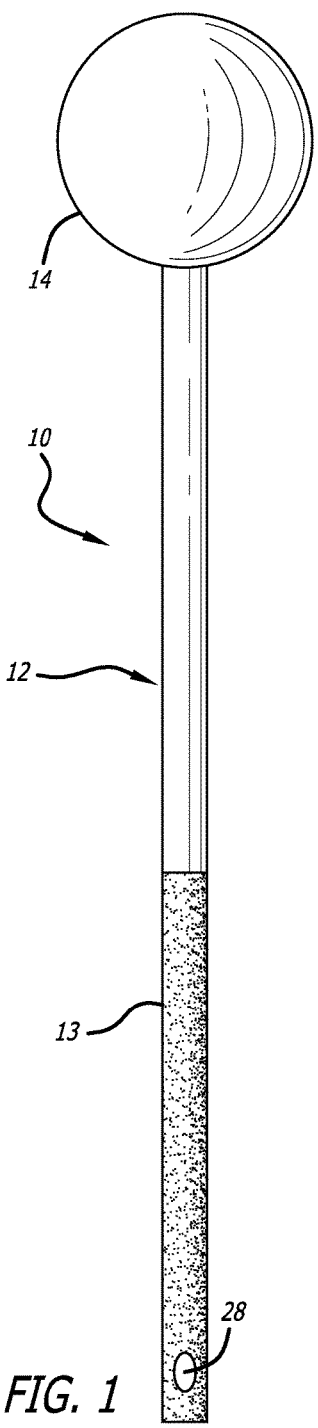
FIG. 1 is a side view of an illustrative embodiment of the sledge hammer of the present invention.

FIG. 1 is a frontal view of an illustrative embodiment of the sledge hammer of the present invention. The inventive hammer 10 includes an elongate handle 12 having a longitudinal axis, a transverse axis, a proximal end and a distal end. A flexible generally geometrically uniform mass 14 is affixed to the handle 12 at the distal end thereof. In the best mode, the handle 12 is fiberglass. However, wood, plastic, metal and other suitably stiff materials may be suitable. In any case, in the illustrative embodiment, the handle 12 is approximately three (3) feet (less than one (1) meter) in length and approximately 1.5 inches in diameter. A grip 13 is included at the proximal end of the handle 12. The grip 13 may be implemented with grooves cut into the handle or with tape wrapped around the handle 12.

In the best mode, the mass 14 is a ball which may be perfectly round or have one or more flat surfaces. The ball 14 should have some dampening properties and may be elastic as well. Urethane would be an ideal material for the construction of the ball however the present invention is not limited thereto. Other materials, such as rubber, might be used without departing from the scope of the present invention.

Figure 2:
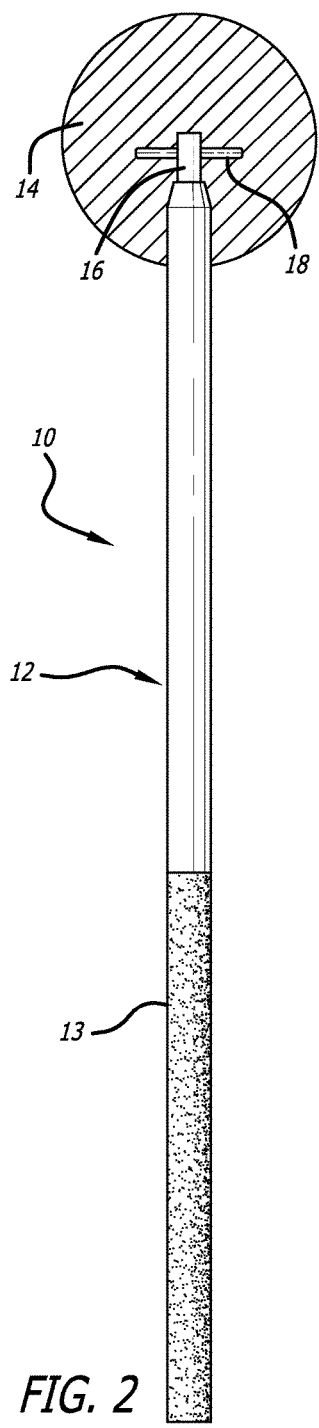
FIG. 2 is a simplified side view of an illustrative embodiment of an electronic striking target in accordance with an alternative embodiment of the present invention.

FIG. 2 is a sectional side view of the hammer depicted in FIG. 1.

FIG. 3 is a sectional front view of the hammer depicted in FIG. 1.

FIG. 4 is a magnified view of the distal end of the handle of the hammer depicted in FIG. 3.

As shown in FIG. 2, in the illustrative embodiment, the ball 14 is secured to the handle with a protrusion 16 mounted at the distal end 20 of the handle 12. The protrusion 16 is an extension from the handle 12 and, in the best mode, is integral therewith.

As shown in FIGS. 2-4, the protrusion 16 has a pin 18 extending therethrough. The pin 18 and a notch 26 are oriented along a transverse axis relative to the longitudinal axis of the handle 12. The pin 18 may be steel, aluminum, plastic or other suitable material. The pin 18 extends into the ball 14.

An open channel 22 extends through the distal end of the handle 20. In the best mode, the ball 14 is molded onto the distal end 20 of the handle 12 and extends entirely through and fully occupies the open channel 22 through the handle 12. This interlocks the ball 14 to the handle 12 and, in conjunction with the pin 18, serves to secure the ball 14 to the handle 12.

The distal end 20 of the handle 12 may be tapered as shown in FIG. 4. An optional hang hole 28 is included in the handle 12.

In the illustrative embodiment, the handle 12 is cylindrical and approximately 32.5 inches in length, to the mass or ball 14, 1.278 inches in width, 1.125 inches in depth and has a urethane grip 13 covering along approximately 15.5 inches thereof. The protrusion 16 is a rectangular cylinder 1.389 inches in length, 1 inch in width and 0.6 inches in depth. The pin 18 is a rod 2.722 inches in length and 0.28 inches in diameter. The notch 26 is shown as an inverted trapezoid. However those of ordinary skill in the art will appreciate that the present invention is not limited thereto. The notch is approximately 0.25 inches in height, 0.75 inches in width and 0.25 inches from the end of the protrusion 16. The ball 14 is approximately seven (7) inches in diameter and weighs 6-15 pounds.

Core Hammer Manufacturing Procedure

In the best mode, the core hammer ball 10 is manufactured using a "hot cast" polyurethane resin and an open mold casting method. A polyurethane prepolymer and curative blend is used to achieve a proper "low rebound" physical characteristics required to safely mimic a sledge hammer/tire workout without the tire, while minimizing the impact transfer through the handle to the user's body. To achieve this, a polypropylene glycol based TDI terminated polyether prepolymer is combined with an amine blend diol curative and a polyol based pigment at proper ratios and temperatures using a meter/mix dispensing machine. The meter/mix machine should allow an "air free" mixture of the three components to be dispensed into the mold at a required casting temperature to produce the most structurally sound hammer possible.

Before casting, the core hammer handle and hammer mold should be preheated to 212 to 230 degrees Fahrenheit in an industrial recirculating oven. The meter/mix machine vacuum degasses and heats the polyurethane prepolymer to approximately 180 degrees F. and combines it with the curative and pigment. The operator should then dispense the polyurethane mixture into the preheated hammer mold and place the filled mold into an oven for an initial cure. Once the polyurethane has set, approximately 45 minutes, the molded hammer should be removed from the mold and placed in a recirculating curing oven at 212 degrees F. for 12 to 16 hours. This completes the required post-cure needed to achieve the optimal physical properties of the polyurethane. After post-curing, the molded hammer is removed from the oven and allowed to cool to room temperature. An additional 72 hours at room temperature is required for the final rebound characteristics to be achieved.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A sledge hammer comprising:
    an elongate handle having a longitudinal axis, a proximal end, and a distal end with a channel therethrough oriented along a transverse axis relative to said longitudinal axis;
    a protrusion mounted at said distal end of said handle having a pin therethrough oriented along said transverse axis relative to said longitudinal axis and
    a flexible generally geometrically uniform mass affixed to said handle at said distal end thereof, said mass being molded onto said distal end whereby at least part of the mass extends entirely through and fully occupies the channel such that the mass in the channel couples mass disposed on a first side of said handle, relative to said longitudinal axis, to mass disposed on a second side of said handle, relative to said longitudinal axis, diametrically opposed to said mass on said first side of said handle and thereby cooperates with the pin to secure the mass to the handle.

2. The sledge hammer of claim 1 wherein said mass is a ball.

3. The sledge hammer of claim 2 wherein said ball is round.

4. The sledge hammer of claim 2 wherein said ball is elastic.

5. The sledge hammer of claim 2 wherein said ball is urethane.

6. The sledge hammer of claim 1 wherein said protrusion is fiberglass.

* * * * *